(12) United States Patent
Tomimori

(10) Patent No.: US 12,080,011 B2
(45) Date of Patent: Sep. 3, 2024

(54) SIZE ESTIMATION DEVICE, SIZE ESTIMATION METHOD, AND RECORDING MEDIUM

(71) Applicant: NEC Corporation, Tokyo (JP)

(72) Inventor: Hiroyuki Tomimori, Tokyo (JP)

(73) Assignee: NEC CORPORATION, Tokyo (JP)

(*) Notice: Subject to any disclaimer, the term of this patent is extended or adjusted under 35 U.S.C. 154(b) by 356 days.

(21) Appl. No.: 17/761,663

(22) PCT Filed: Aug. 27, 2020

(86) PCT No.: PCT/JP2020/032415
§ 371 (c)(1),
(2) Date: Mar. 18, 2022

(87) PCT Pub. No.: WO2021/065265
PCT Pub. Date: Apr. 8, 2021

(65) Prior Publication Data
US 2022/0327721 A1    Oct. 13, 2022

(30) Foreign Application Priority Data
Sep. 30, 2019    (JP) .................. 2019-178601

(51) Int. Cl.
*G06V 10/00*    (2022.01)
*A01K 61/90*    (2017.01)
(Continued)

(52) U.S. Cl.
CPC .............. *G06T 7/593* (2017.01); *A01K 61/90* (2017.01); *G06T 7/74* (2017.01); *G06V 10/70* (2022.01);
(Continued)

(58) Field of Classification Search
CPC ........ G06N 20/00; G06N 20/10; G06N 20/20; G06N 3/08; G06N 3/045; G06N 3/0454;
(Continued)

(56) References Cited

U.S. PATENT DOCUMENTS 11,113,539 B2 *  9/2021  Atwater ................. A01K 61/90
11,170,209 B1 *  11/2021  Ma ........................ G06V 20/05
(Continued)

FOREIGN PATENT DOCUMENTS

JP            6694039 B     5/2020
WO    2018/061925 A1     4/2018
(Continued)

OTHER PUBLICATIONS

International Search Report for PCT Application No., PCT/JP2020/032415, mailed on Nov. 10, 2020.
English translation of Written opinion for PCT Application No. PCT/JP2020/032415, mailed on Nov. 10, 2020.

*Primary Examiner* — Amir Alavi
(74) *Attorney, Agent, or Firm* — Sughrue Mion, PLLC

(57) ABSTRACT

The size estimation device 5 is provided with an estimation unit 51 and a calculation unit 52. The estimation unit 51 estimates, on the basis of a learning model which learns the feature of a first underwater creature body that faces one direction in an image captured in the water, a first feature point that indicates one end in a one direction side of a second underwater creature body that faces a one direction included in an image captured outside and a second feature point that indicates the other end. The calculation unit 52 calculates information indicating the size of the second underwater creature body on the basis of information including the first feature point and the second feature point.

10 Claims, 13 Drawing Sheets

(51) Int. Cl.
    *G06T 7/593*    (2017.01)
    *G06T 7/73*     (2017.01)
    *G06V 10/70*    (2022.01)
    *G06V 20/05*    (2022.01)

(52) U.S. Cl.
    CPC .... *G06V 20/05* (2022.01); *G06T 2207/10012* (2013.01); *G06T 2207/20081* (2013.01); *G06T 2207/20084* (2013.01)

(58) Field of Classification Search
    CPC ...... G06N 3/0475; G06N 3/082; G06N 3/092; G06N 3/042; G06N 3/0464; G06N 3/049; G06N 3/02; G06T 2207/10012; G06T 2207/10021; G06T 2207/20081; G06T 2207/20084; G06T 7/593; G06T 7/62; G06T 7/74; A01K 61/90; G06V 10/25; G06V 10/70; G06V 20/05; Y02A 40/81; G01B 11/02
    See application file for complete search history.

(56) References Cited

U.S. PATENT DOCUMENTS

| | | | | |
|---|---|---|---|---|
| 11,232,297 | B2 * | 1/2022 | James | G06V 40/103 |
| 11,475,689 | B2 * | 10/2022 | Young | G06V 20/05 |
| 11,594,058 | B2 * | 2/2023 | James | G06F 18/23 |
| 11,615,638 | B2 * | 3/2023 | James | G06T 7/62 |
| | | | | 119/421 |
| 11,842,473 | B2 * | 12/2023 | Ling | G06V 20/05 |
| 11,967,166 | B2 * | 4/2024 | Wang | G06V 10/82 |
| 2019/0277624 | A1 | 9/2019 | Kitagawa | |
| 2020/0027231 | A1 | 1/2020 | Kitagawa et al. | |
| 2020/0394402 | A1 | 12/2020 | Kitagawa | |
| 2021/0329892 | A1 * | 10/2021 | Kozachenok | A01K 61/95 |
| 2022/0327721 | A1 * | 10/2022 | Tomimori | G06T 7/593 |

FOREIGN PATENT DOCUMENTS

| | | |
|---|---|---|
| WO | 2018/061927 A1 | 4/2018 |
| WO | 2019/045089 A1 | 3/2019 |
| WO | 2019/172351 A1 | 9/2019 |

\* cited by examiner

SIZE ESTIMATION DEVICE, SIZE ESTIMATION METHOD, AND RECORDING MEDIUM

This application is a National Stage Entry of PCT/JP2020/032415 filed on Aug. 27, 2020, which claims priority from Japanese Patent Application 2019-178601 filed on Sep. 30, 2019, the contents of all of which are incorporated herein by reference, in their entirety.

TECHNICAL FIELD

The present invention relates to a size estimation device and the like for estimating a size of an underwater creature.

BACKGROUND ART

There is a need to develop a system for monitoring underwater creatures. Such a system estimates the size of an underwater creature (for example, a fish) grown in a cage to determine the time of shipment, and detects the state of an underwater creature growing on the sea, river, and the like. Patent literature (PTL) 1 discloses a technique related to estimation of a length of a fish.

CITATION LIST

Patent Literature

[PTL 1] WO 2019/045089 A

SUMMARY OF INVENTION

Technical Problem

Patent Literature 1 discloses a technique of specifying of one individual of fish body in a rectangular region in an image in which a plurality of fish is photographed, specifying spatial coordinates of feature parts (the head and tail of the fish body) of the specified fish body, and detecting an interval of the spatial coordinates to calculate a length of the fish body. However, this method has a problem that highly accurate estimation cannot be performed in a case where fish bodies facing various directions are mixed in a captured image.

The present disclosure has been made in view of the above problems, and an object of the present disclosure is to provide a size estimation device and the like capable of estimating the size of an underwater creature with high accuracy.

Solution to Problem

In view of the above problem, a size estimation device according to a first aspect of the present disclosure includes:

an estimation unit configured to estimate, based on a learning model that learns a feature of a first underwater creature body facing one direction in an image captured in water, a first feature point that indicates one end on the one direction side of a second underwater creature body facing the one direction included in an image captured outside and a second feature point that indicates another end; and a calculation unit configured to calculate information indicating a size of the second underwater creature body based on information including the first feature point and the second feature point.

A size estimation system according to a second aspect of the present disclosure includes:

the above-described size estimation device; and
one or more cameras that capture an image including the first underwater creature body and an image including the second underwater creature body in water and transmit the images to the size estimation device.

A size estimation method according to a third aspect of the present disclosure includes:

estimating, based on a learning model that learns a feature of a first underwater creature body facing one direction in an image captured in water, a first feature point that indicates one end on the one direction side of a second underwater creature body facing the one direction included in an image captured outside and a second feature point that indicates another end; and calculating information indicating a size of the second underwater creature body based on information including the first feature point and the second feature point.

A size estimation program according to a fourth aspect of the present disclosure causes a computer to achieve:

estimating, based on a learning model that learns a feature of a first underwater creature body facing one direction in an image captured in water, a first feature point that indicates one end on the one direction side of a second underwater creature body facing the one direction included in an image captured outside and a second feature point that indicates another end; and calculating information indicating a size of the second underwater creature body based on information including the first feature point and the second feature point.

The size estimation program may be stored in a non-transitory computer-readable/writable recording medium.

Advantageous Effects of Invention

According to the present invention, it is possible to provide a size estimation device and the like capable of estimating the size of an underwater creature with high accuracy.

EXAMPLE EMBODIMENT

Figure 1:
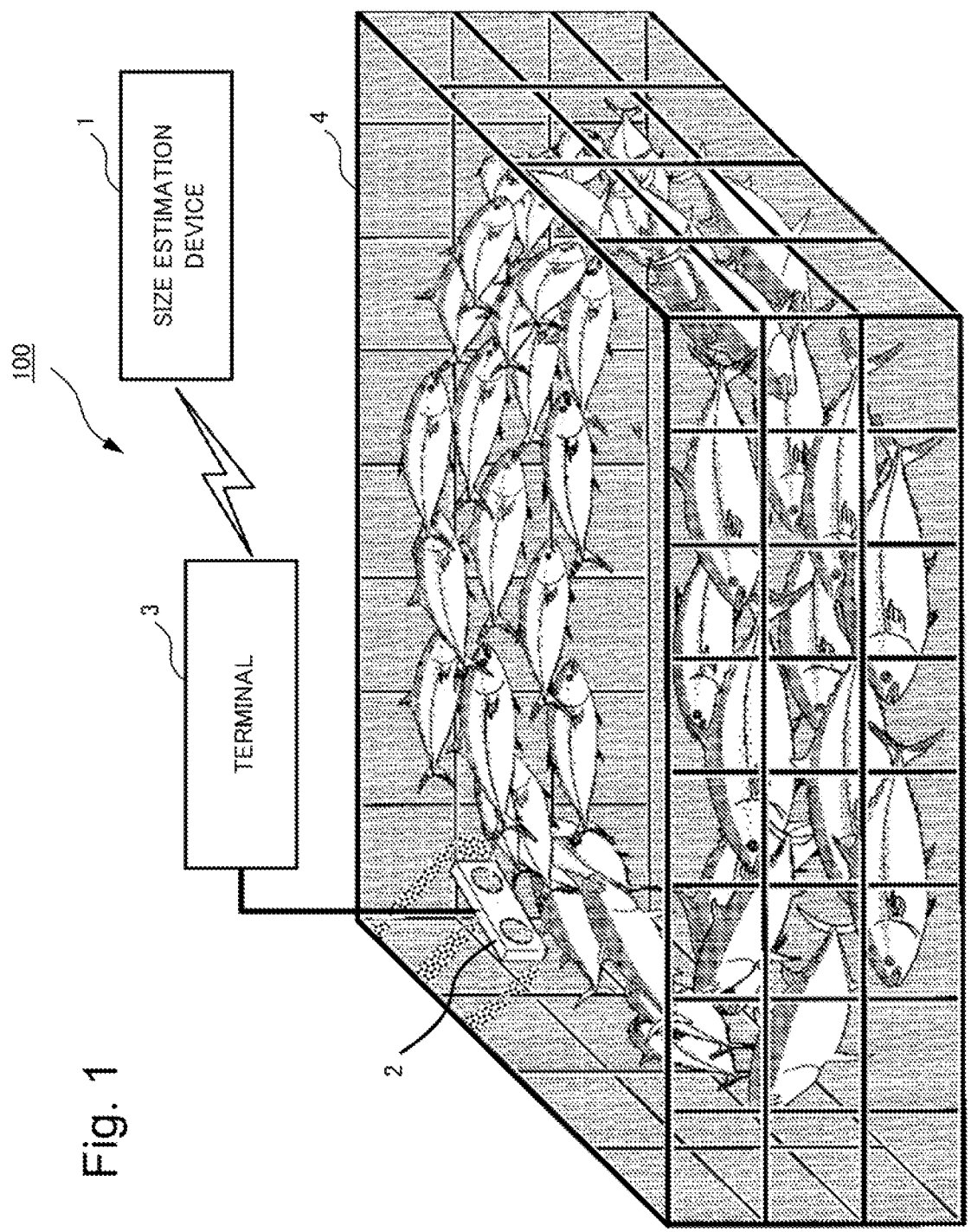
FIG. 1 is a block diagram illustrating a configuration example of a size estimation system according to a first example embodiment of the present disclosure.

Although it is difficult to observe underwater creatures that inhabit the sea and the river unlike terrestrial creatures, it may be necessary to observe underwater. For example, in fish aquaculture, the observation and size estimation of fish in aquaculture are necessary for determining the time of shipment and the amount of feeding. Here, the underwater creature refers to a creature that inhabits in the water, such as fish and crustaceans, and in the following example embodiments, fish will be described as an example.

Therefore, in each example embodiment of the present disclosure, a method of estimating the size of a fish in the water with high accuracy will be described. In the present disclosure, in estimating the size of a fish, the directions (right, left) of the fish are recognized from the captured image of the fish, and size estimation is performed using a learning model machine-learned using correct data in which the directions are aligned. Therefore, at the time of learning of the learning model (first and second learning models), the first learning model learns to be able to estimate the rectangle surrounding the fish and the direction of the fish, and the second learning model learns to use only the captured image (correct data) of a fish with one direction, for example, a fish facing the left direction and estimate the feature point of the body of the fish. In the size estimation of the fish using the learned learning model, the rectangle surrounding the fish and the direction of the fish are estimated from the captured image of the fish by the first learning model, and the feature point of the fish body that is the direction of the fish is estimated by the second learning model. The first learning model is preferably adjusted by machine learning such that, in a pair of images, the fish body appearing in the first image and the fish body appearing in the second image are fish bodies indicating the identical individual.

By executing learning processing and estimation processing in a state where the directions of the fish are aligned in this manner, it is possible to estimate the size with higher accuracy as compared with a case where the learning processing and the like are executed in a state where the directions of the fish are mixed.

In the second learning model, regarding the other direction, that is, the right direction, the learning may be similarly performed using only the captured image of a fish facing the right direction as the correct data, or the image of the fish facing the right direction may be discarded as not being the correct data. Further, in the second learning model, in the case of left-facing learning, it is preferable to use only the image of the fish facing the left direction. However, the image of the fish facing the right direction may be horizontally reversed to be processed into the image of a fish facing the left direction, and then the processed image may be used as the correct data. Similarly, in the case of right-facing learning, it is preferable to use only the image of the fish facing the right direction. However, the image of the fish facing the left direction may be horizontally reversed to be processed into the image of a fish facing the right direction, and then the processed image may be used as the correct data.

Hereinafter, each example embodiment will be described in detail.

First Example Embodiment (Size Estimation System)

Hereinafter, a size estimation system 100 according to a first example embodiment of the present disclosure will be described with reference to the drawings.

FIG. 1 is a diagram illustrating a schematic configuration of the size estimation system 100. As illustrated in FIG. 1, the size estimation system 100 includes a size estimation device 1, a stereo camera 2, and a terminal 3.

The stereo camera 2 captures an image of a fish in the water. The stereo camera 2 includes two right and left lenses, and these lenses are fixedly arranged at a predetermined distance. Since the stereo camera 2 simultaneously captures two images with these lenses, it is possible to capture a pair of images (a left image and a right image) with slightly shifted angles. The camera that captures images of fish is not limited to the stereo camera 2, and may be two single-lens cameras which are fixedly arranged in the water such that two or more images of fish grown in a cage 4 can be captured.

Figure 2:
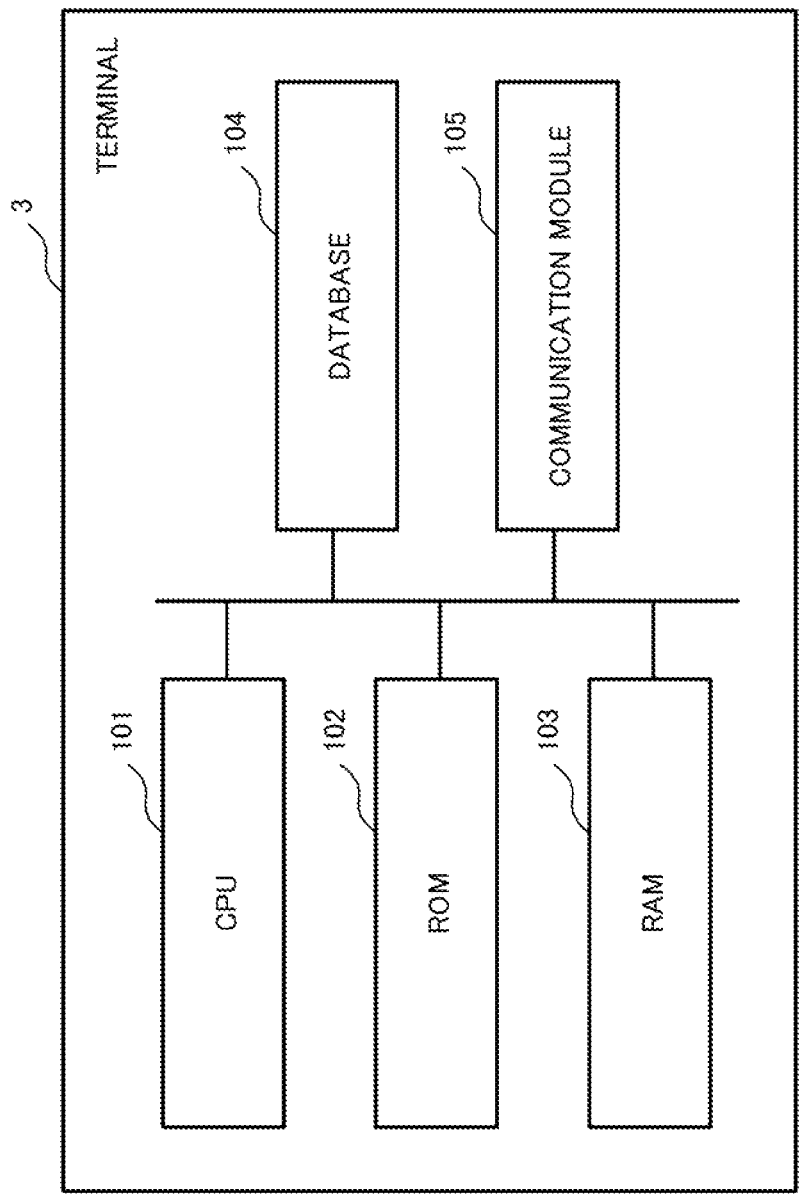
FIG. 2 is a block diagram illustrating a configuration example of a terminal.

The terminal 3 is installed between the stereo camera 2 and the size estimation device 1, and is communicably connected to both. The communication may be wired or wireless. The terminal 3 transfers the image captured by the stereo camera 2 to the size estimation device 1. Further, the terminal 3 executes an imaging instruction to the stereo camera 2 according to a program. FIG. 2 is a diagram illustrating an example of a hardware configuration of the terminal 3. The terminal 3 includes at least a central processing unit (CPU) 101 which controls image transfer and imaging instructions, a read only memory (ROM) 102 which stores programs and the like, a random access memory (RAM) 103 which is a temporary storage memory, a database 104 which temporarily stores images captured by the stereo camera 2, and a communication module 105 which communicates with the size estimation device 1.

(Size Estimation Device)

Figure 3:
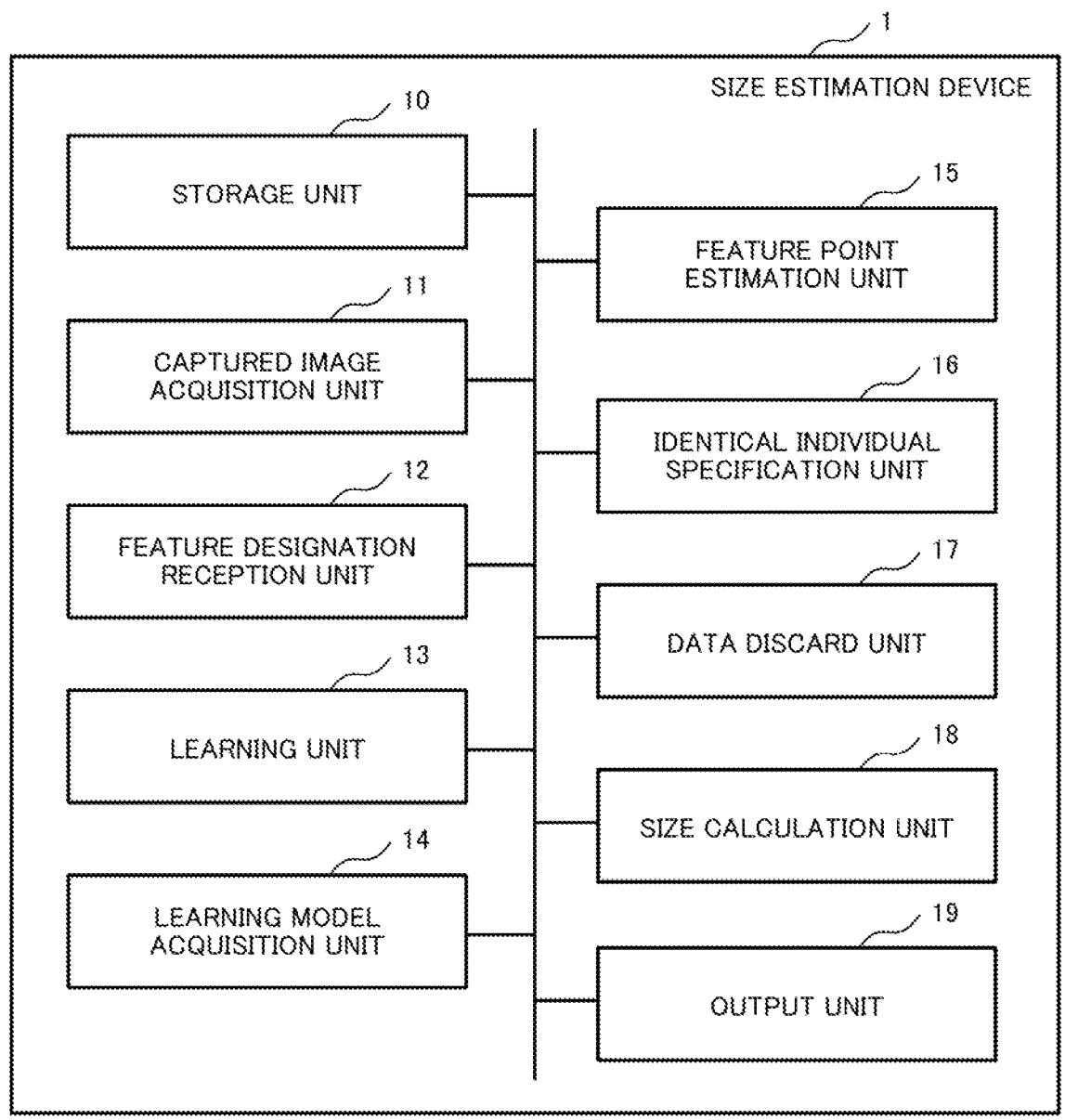
FIG. 3 is a block diagram illustrating a configuration example of a size estimation device according to the first example embodiment of the present disclosure.

The size estimation device 1 executes processing of generating a learning model based on the image of a fish and processing of estimating the size of the fish using the generated learning model. FIG. 3 is a diagram illustrating an example of functional blocks of the size estimation device 1. The size estimation device 1 includes a storage unit 10, an image acquisition unit 11, a feature designation reception unit 12, a learning unit 13, a learning model acquisition unit 14, a feature point estimation unit 15, an identical individual specification unit 16, a data discard unit 17, a size calculation unit 18, and an output unit 19.

The storage unit 10 stores an image captured by the stereo camera 2, a learning model learned from the image, and the like.

Figure 4:
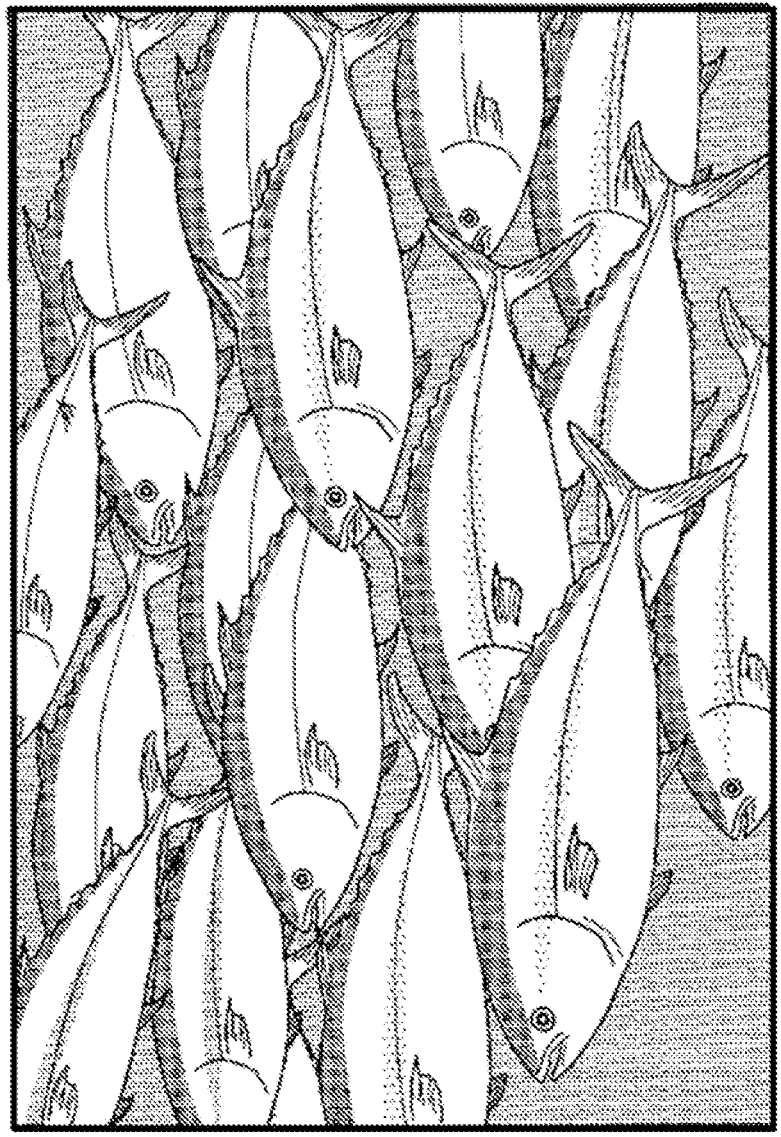
FIG. 4 is a view illustrating an example of an image of fish captured by a stereo camera.

The image acquisition unit 11 acquires an image captured by the stereo camera 2 or an image temporarily stored in the database 104 via the terminal 3 and stores the acquired image in the storage unit 10. FIG. 4 is a diagram illustrating an example of the image captured by the stereo camera 2. In many cases, a plurality of fish is photographed in the captured image. The stereo camera 2 captures light incident on each of two right and left lenses by an imaging element, and captures two captured images corresponding to the respective lenses at the same timing at predetermined time intervals (for example, every one second). Among a pair of the captured images, the image captured by the right lens is also referred to as a first image, and the image captured by the left lens is also referred to as a second image. FIG. 4 illustrates any one captured image of the first image and the second image. Since the right and left lens positions of the stereo camera 2 are different, the positions of the identical individual fish appearing in the first image and the second image are slightly different in the images. The stereo camera 2 may generate several or several tens of pair images by continuously imaging only for 10 seconds, for example, or may generate a pair image by imaging every one second. When acquiring a pair image via the terminal 3, the image acquisition unit 11 may store, in the storage unit 10, the acquisition time of the pair image by the image acquisition unit 11 and the imaging time of the pair image by the stereo camera 2 in association with each of the first image and the second image.

The feature designation reception unit 12 receives inputs of a rectangular range in which a whole fish appearing in the image fits and a plurality of feature points on the surface of the whole fish. The rectangular range is an example of a range surrounding a fish body, and the range is not limited to a rectangle. For example, the range may be a circle or an ellipse.

The learning unit 13 uses an image including a plurality of fish bodies (first underwater creature bodies) facing in one direction to generate a learning model for learning feature points including a first feature point indicating one end on the one direction side in the longitudinal direction of the fish body and a second feature point indicating the other end. The fish body to be learned is also referred to as a first underwater creature body. Here, "facing one direction" means that a fish body faces one direction (a direction facing the left side of the image in FIG. 4) as illustrated in FIG. 4. In the present example embodiment, facing the left side of a certain image like the fish body in FIG. 4 is described as leftward, and facing the opposite direction to the fish body in FIG. 4, that is, facing the right side of the certain image is described as rightward. The learning unit 13 learns, as learning models, a first learning model for estimating a range surrounding a fish body to be learned and a direction of the fish body to be learned, and a second learning model for estimating at least the first feature point and the second feature point of the fish body to be learned. The learning unit 13 performs machine learning based on the image received from the image acquisition unit 11 and the feature point for specifying the shape of the fish appearing in the image, and generates the first learning model and the second learning model.

The learning unit 13 performs learning such that the first learning model estimates the rectangle surrounding a fish and the direction of the fish. Further, the learning unit 13 performs learning such that the second learning model estimates the feature point of the body of the fish facing the left direction, for example, by using only the captured image (correct data) of the fish facing the left direction. Regarding the other direction, that is, the right direction, the learning unit 13 may perform learning such that the second learning model similarly estimates the feature point of the body of the fish facing the right direction by using only the captured image of the fish facing the right direction. The second learning model may perform learning on only one type of right-facing or left-facing, or may perform learning on two types of right-facing and left-facing.

The learning model acquisition unit 14 acquires the first and second learning models generated by the learning unit 13 at the start of size estimation processing or the like.

Based on a learning model which learns the feature of a fish body (first underwater creature body) that faces one direction in an image captured in the water, the feature point estimation unit 15 estimates a first feature point that indicates one end on the one direction side of a fish body (second underwater creature body) facing the one direction included in an image captured outside and a second feature point that indicates the other end. The fish body to be estimated is also referred to as a second underwater creature body. The one end on the one direction side may be a peripheral edge of the one end. The other end may be a peripheral edge of the other end. Specifically, the feature point estimation unit 15 uses the first learning model to specify a second rectangular range A2 (FIG. 9) surrounding the identical individual of fish appearing in both the first image and the second image and the direction of the fish body, and uses the second learning model to estimate a feature point that specifies the shape feature of the fish appearing in the second rectangular range A2. In a case where the fish body to be estimated included in the image captured outside does not face a predetermined direction, the feature point estimation unit 15 converts the direction of the fish body to be estimated into the predetermined direction. Further, the feature point estimation unit 15 estimates the first feature point and the second feature point in the longitudinal direction of the fish body to be estimated, and a third feature point indicating one end and a fourth feature point indicating another end in the short direction with respect to the longitudinal direction of the fish body.

The identical individual specification unit 16 acquires a pair of images captured by the stereo camera 2 from the storage unit 10, and specifies an identical individual (target fish) included in both of the pair of images. In a case where a plurality of fish moves in the images, each of the plurality of fish is specified. The identical individual specification unit 16 specifies the identical individual based on the processing request from the feature point estimation unit 15, and returns the specified identical individual to the feature point estimation unit 15.

In a case where the relationship of each of a plurality of feature points in a certain fish determined by automatic recognition processing using the second learning model is abnormal, for example, exceeds a predetermined threshold value or is lower than the threshold value, the data discard unit 17 discards the estimation result. The data discard unit 17 may acquire an image in which a target fish body appears at various timings and perform discard processing of the image. For example, the data discard unit 17 receives the estimation result of an image by the feature point estimation unit 15, determines whether the estimation result satisfies a predetermined condition, and performs discard processing based on the determination result. Details will be described later.

The size calculation unit 18 calculates information indicating the size of the fish based on the feature points (the first to fourth feature points described later) of the fish in the image. The information indicating the size is, for example, a tail fork length, a body length, a body height, and a weight.

The output unit 19 generates output information based on the information indicating the size calculated by the size calculation unit 18, and outputs the output information to a predetermined output destination, for example, a display monitor (not illustrated) viewed by an operator.

(Operation of Size Estimation Device)

The operation of the size estimation device 1 in the size estimation system 100 will be described. The operation of the size estimation device 1 is divided into three parts: "1. Processing of learning image", "2. Learning processing using learning image", and "3. Size estimation processing using learned model". Hereinafter, these three operations will be described.

((Processing of Learning Image))

Figure 5:
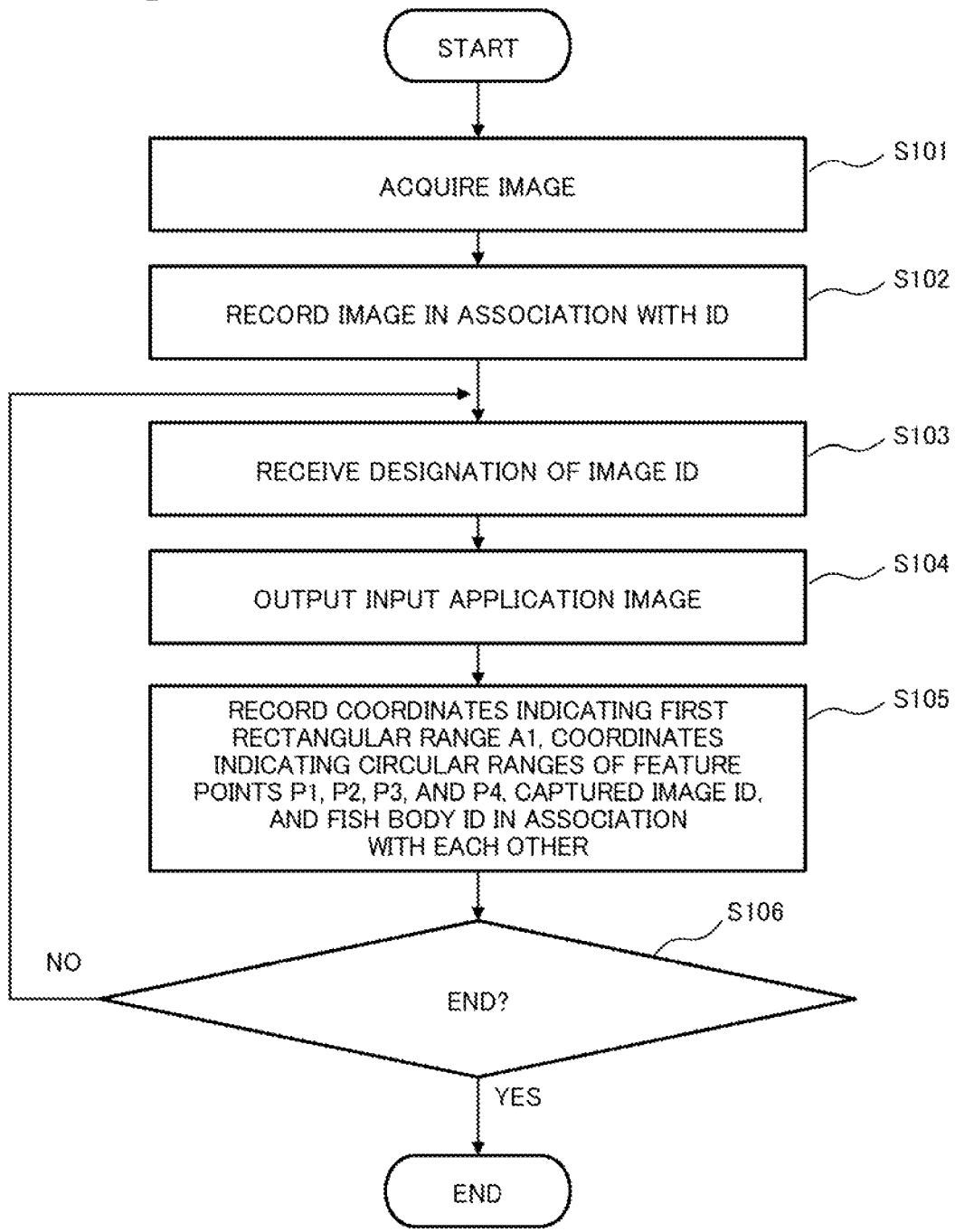
FIG. 5 is a flowchart illustrating an operation of the size estimation device according to the first example embodiment of the present disclosure.

The processing of a learning image by the size estimation device 1 will be described with reference to a flowchart of FIG. 5.

In step S101, the image acquisition unit 11 of the size estimation device 1 sequentially acquires images captured by the stereo camera 2 via the terminal 3. The image acquisition unit 11 sequentially acquires a pair of images (the first image and the second image) captured by the stereo camera 2 at the same time. The amount of images to be acquired is an amount that can be generated by the first learning model and the second learning model.

In step S102, the image acquisition unit 11 records the acquired image in association with the ID in the storage unit 10. Specifically, the image acquisition unit 11 generates an ID for each of the first image and the second image. The image acquisition unit 11 associates the first image with the ID thereof (for example, G1-R) and associates the second image with the ID thereof (for example, G1-L), and associates the first image and the second image generated at the same time with each other as a pair to store the result in the storage unit 10. The image acquisition unit 11 may associate the time when the pair image is captured and the time when the image acquisition unit 11 acquires the pair image with the pair image to store the result in the storage unit 10.

In step S103, the feature designation reception unit 12 receives designation of an image ID to be used for learning from the operator. For example, thumbnail images of a plurality of images are presented on a display monitor (not illustrated) viewed by the operator, and the operator is prompted to make a selection. When the feature designation reception unit 12 receives the selected image ID, the image associated with the ID is acquired from the storage unit 10.

Figure 6:
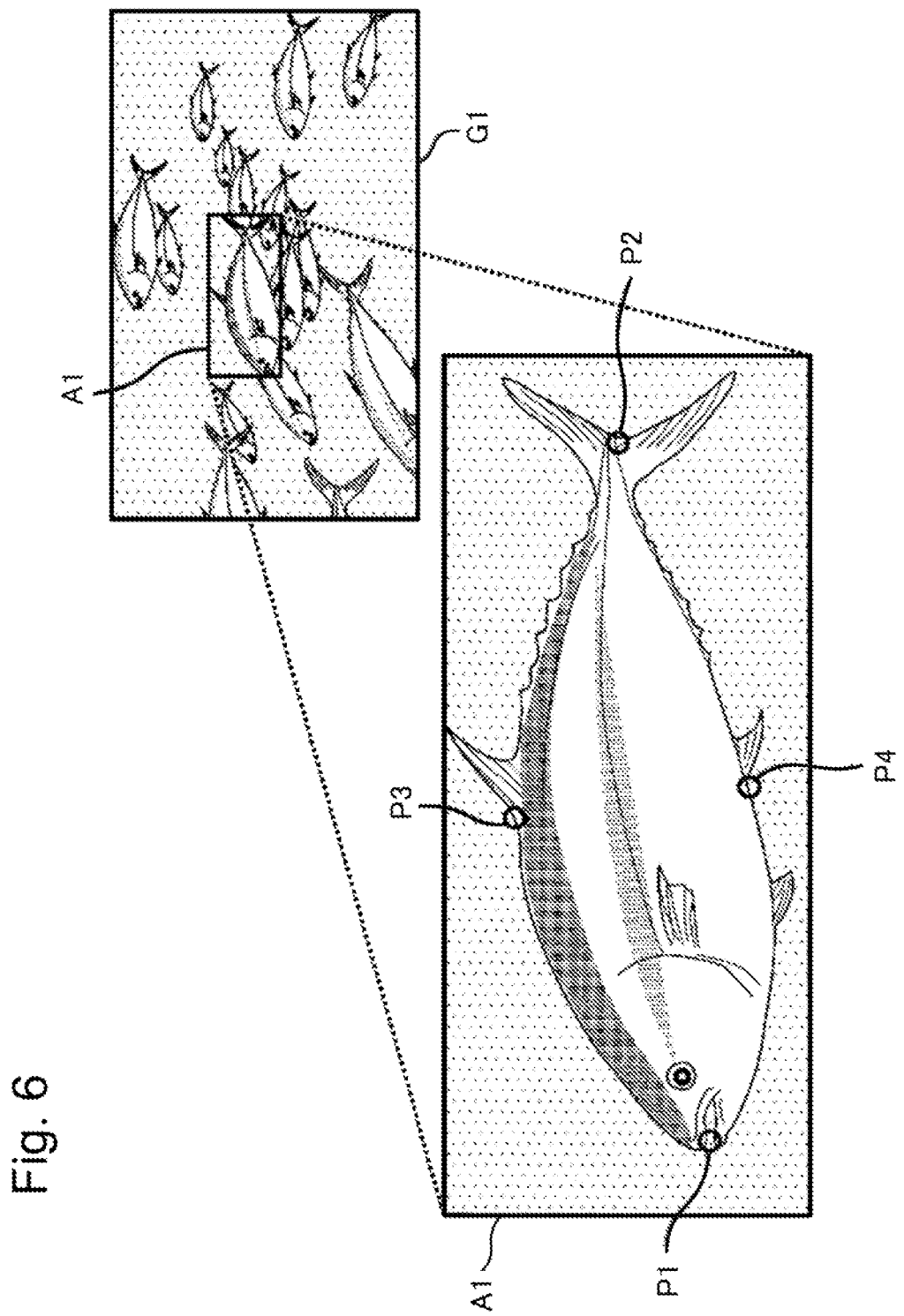
FIG. 6 is a view illustrating a first input image captured and a first rectangular range in the first input image.

In step S104, the feature designation reception unit 12 outputs an input application screen to a display monitor (not illustrated) viewed by the operator to prompt the operator to make an input. Specifically, the feature designation reception unit 12 displays a first input image G1 (see FIG. 6) which is the image designated by the operator on the input application screen. The operator designates a first rectangular range A1 such that one individual of whole fish is included in the first input image G1. The designation is performed using an input interface such as a mouse or a touch panel. The feature designation reception unit 12 presents a second input image A1 (see FIG. 6), which is an image obtained by enlarging the first rectangular range, on the input application screen, and prompts the operator to input feature points. The operator designates a first feature point, a second feature point, a third feature point, and a fourth feature point (hereinafter, feature points P1, P2, P3, and P4 are also described) for specifying the shape feature of the fish in the second input image A1 by using the input interface. P1 is a point indicating a peripheral edge of one end on the head side (facing direction side) in the longitudinal direction of the fish body in the image. P2 is a point indicating a peripheral edge of the other end opposite to the direction in which the fish body faces. P3 is a point indicating a peripheral edge of one end in the short direction of the fish body. P4 is a point indicating a peripheral edge of the other end in the short direction of the fish body.

Specifically, the feature points P1, P2, P3, and P4 each may be a region (hereinafter, also referred to as a circular range. See FIG. 6) inside a circle centered on the feature point. P1 is a circular range of the feature point indicating a mouth tip end position, P2 is a circular range of the feature point indicating a position of an outer edge of a central recess where a tail fin is bifurcated, P3 is a circular range of the feature point indicating a dorsal fin front base position, and P4 is a circular range of the feature point indicating a ventral fin front base position. The size of the circular range may be defined or may be settable by the operator.

In step S105, the feature designation reception unit 12 stores, in the storage unit 10, coordinates indicating the designated first rectangular range A1 (for example, coordinates of each of four corners of A1), coordinates indicating the circular ranges of the designated feature points P1, P2, P3, and P4 (for example, the coordinates may be center coordinates of each circular range), an ID of an image designated with these pieces of information, and a fish body ID for identifying a whole fish in the image in association with each other. The set of data is preferably recorded with the fish body ID as a primary key. This is because a plurality of fish is often photographed in a captured image, and it is easier to search using a fish as a primary key.

The operator repeats the processing of steps S103 to S105 for each of a plurality of fish imaged in each of a pair of images.

Finally, in step S106, the feature designation reception unit 12 determines whether the designation processing by the operator for each of the plurality of fish imaged in one image ends, and ends the operation of this flowchart when it is determined that the designation processing ends.

Thus, the processing of the learning image by the size estimation device 1 is ended.

((Learning Processing Using Learning Image))

Figure 7:
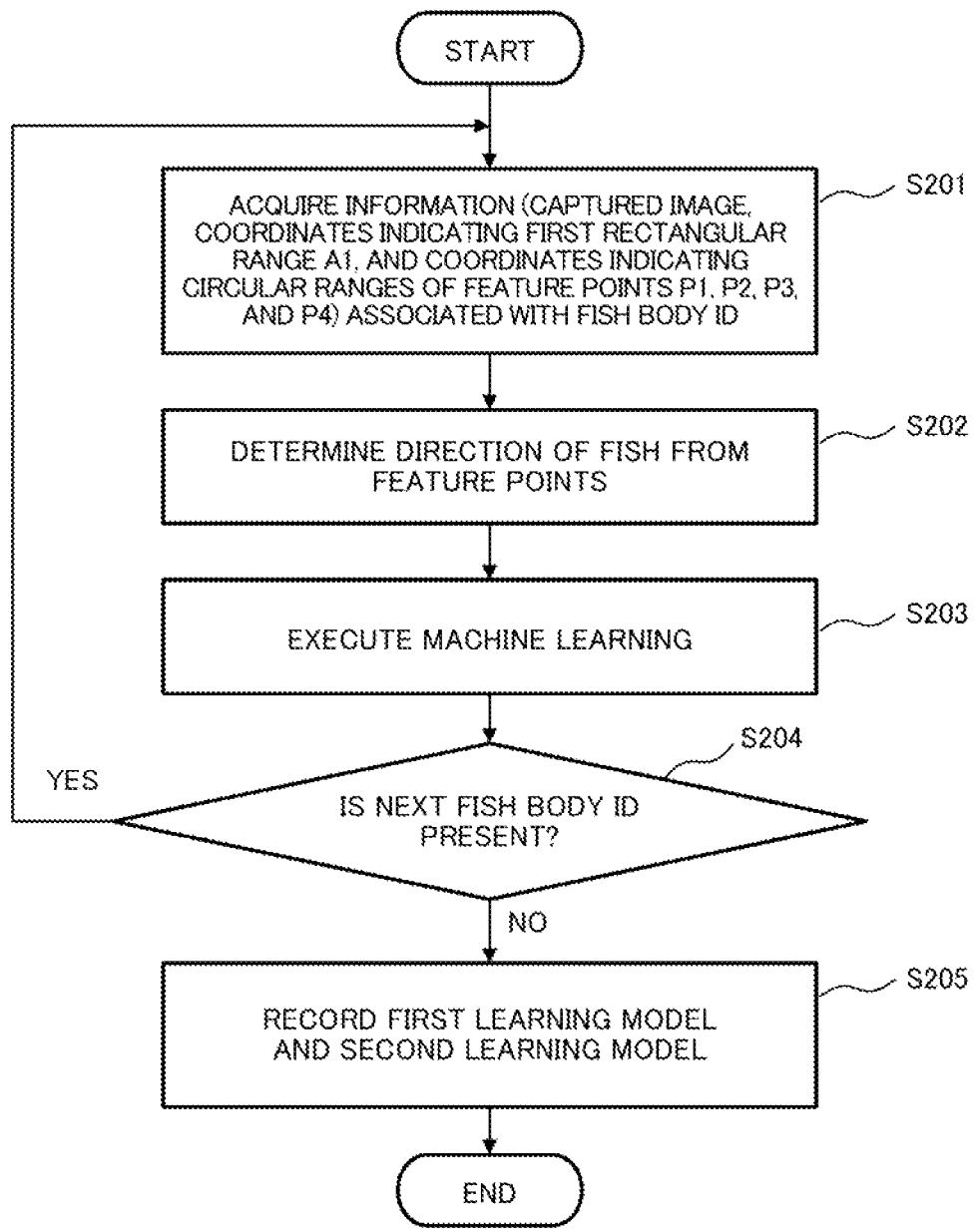
FIG. 7 is a flowchart illustrating an operation of the size estimation device according to the first example embodiment of the present disclosure.

The learning processing using the learning image by the size estimation device 1 will be described with reference to the flowchart of FIG. 7. In the following description, it is assumed that the learning processing is performed after the above-described processing is completed for all images required by the operator. In the following description, it is assumed that the learning is performed using a data set of a fish body facing the left direction.

In step S201, the learning unit 13 selects one of the fish body IDs stored in the storage unit 10, and acquires a data set associated with the selected fish body ID. The data set is an image ID, coordinates indicating the first rectangular range A1, and coordinates indicating the circular ranges of the feature points P1, P2, P3, and P4.

In step S202, the learning unit 13 determines which of the left and right directions the fish is facing from the magnitudes of the values of the horizontal coordinates of the feature points P1 and P2. The learning unit 13 determines that the fish faces the left direction when the feature point P1 is positioned on the left side relative to the feature point P2, and determines that the fish faces the right direction when the feature point P1 is positioned on the right side relative to the feature point P2. For example, when P1 is coordinates (2, −4) and P2 is coordinates (7, −4) in the fourth quadrant (x>0, y<0) having the upper left of the first input image G1 (or the first rectangular range A1) as the origin, the learning unit 13 determines that the coordinate P1 having a small absolute value of the x coordinate is the head of the fish, that is, the direction in which the fish faces. The learning unit 13 determines the direction of the fish based on the coordinate values, and when determining that the fish faces the left direction, the learning unit determines that the image corresponding to the selected fish body ID is a left-facing learning image (correct data). The learning unit 13 determines the direction of the fish based on the coordinate values, and when determining that the fish faces the right direction, the learning unit determines that the image corresponding to the selected fish body ID is a right-facing learning image (correct data). In the case of learning only one direction (for example, left), the learning unit 13 may discard the image (right image) determined not to be the left-facing learning image. In the case of a fish that migrates in one direction in the cage, the learning unit 13 may collect correct data only in the one direction. In principle, in the case of left-facing learning, it is preferable to use only the data set of the fish body ID determined to be left-facing, and in the case of right-facing learning, it is preferable to use only the data set of the fish body ID determined to be right-facing.

In a case where it is desired to increase the correct data, it is also possible to use a data set of fish body IDs facing the opposite direction. In this case, the image of the first rectangular range A1 of the fish body of the opposite direction and the coordinates of the feature points P1, P2, P3, and P4 are horizontally reversed and converted into an image and coordinates in the same direction as the correct data to obtain the learning image.

In a case where there is a variation in the directions of a plurality of fish bodies to be learned, the learning unit 13 corrects the directions of the fish bodies to be learned to face a predetermined direction in one direction. Here, the variation in the directions of the fish bodies refers to a case where the direction of the fish body is different from the predetermined direction, a case where the direction connecting the first feature point and the second feature point of the fish body is different from the predetermined direction, or the like. For example, in a case where the direction of a line horizontally connecting one side and the other side opposite to the one side in the image captured in the water is different from the direction of a line connecting the first feature point and the second feature point of the learning fish body, the angle of the line connecting the first feature point and the second feature point may be corrected so that the directions are the same or substantially the same. For example, in the fourth quadrant (x>0, y<0), in a case where there is a fish facing the left direction downward by 45 degrees at the coordinates P1 (2, −7) and the coordinates P2 (7, −2), the fish may be rotated clockwise by 45 degrees around the coordinates P2 so that the fish body becomes horizontal (to align the value of the y axis) to be prepared to be used as the correct data.

In step S203, the learning unit 13 executes the learning processing by using only the images (correct data) of the fish facing the same direction. The machine learning is executed using a convolutional neural network such as Alexnet. The learning unit 13 sets the coordinates indicating the first rectangular range A1 and the direction (rightward or leftward) of the fish determined from the feature points P1 and P2 as correct data for generating the first learning model. Further, the learning unit 13 may use, as correct data for generating the second learning model, the pixel value of each pixel in the first rectangular range A1 after alignment to either the left direction or right direction (for example, the left direction) and the pixel value of each coordinates included in the circular ranges of the feature points P1, P2, P3, and P4. The learning unit 13 causes a model to learn the correct data, and generates a first learning model for automatically specifying a rectangular range in which a whole fish appearing in the captured image fits and a direction (left or left) of the fish. In addition, the learning unit 13 generates a second learning model for automatically specifying the feature points P1, P2, P3, and P4 of the whole fish appearing in the captured image converted in one direction (for example, the left direction) of the left and right directions. The first learning model is, for example, a model for determining a neural network for outputting a determination result as to whether a rectangular range set in an acquired new image is a rectangular range including only a whole fish and the direction of the fish body. In addition, the second learning model is, for example, a model for determining a neural network for outputting a determination result as to whether a range provided in the image is a range including the feature point P1, a range including the feature point P2, a range including the feature point P3, a range including the feature point P4, or a range not including the feature points P1, P2, P3, and P4.

In step S204, the learning unit 13 determines whether information associated with the next fish body ID is recorded in the storage unit 10, and in a case where the next fish body ID is present, the processing returns to step S201, and the learning unit 13 executes the processing of steps S201 to S203. In a case where there is no next fish body ID, the processing proceeds to step S205.

In step S205, the learning unit 13 stores the generated first learning model and second learning model in the storage unit 10.

By the above processing, the size estimation device 1 generates the first learning model that determines the first rectangular range A1 in which a whole fish in the image fits and the direction of the fish body, and the second learning model that automatically recognizes a plurality of feature points P1, P2, P3, and P4 of the whole fish.

Thus, the learning processing using the learning image by the size estimation device 1 is ended.

((Size Estimation Processing Using Learned Model))

Figure 8:
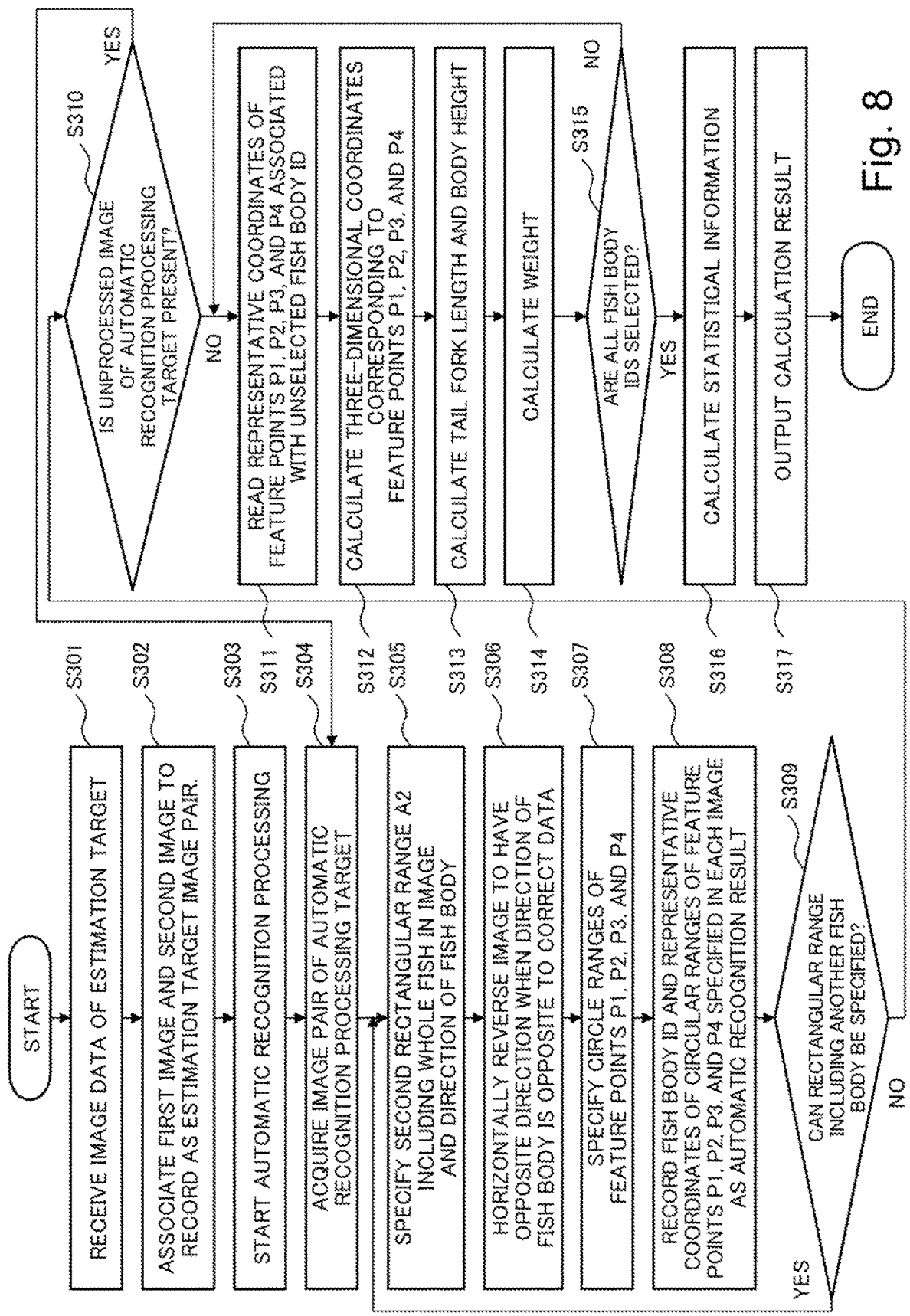
FIG. 8 is a flowchart illustrating an operation of the size estimation device according to the first example embodiment of the present disclosure.

The size estimation processing using the learned model by the size estimation device 1 will be described with reference to the flowchart of FIG. 8.

In step S301, the image acquisition unit 11 of the size estimation device 1 receives an estimation target image pair (the first image and the second image) captured by the stereo camera 2 at a predetermined interval via the terminal 3. For example, the stereo camera 2 performs imaging at set intervals (for example, every one second) until a predetermined time elapses from the start of imaging. After the lapse of the predetermined time, the imaging is ended. Here, the predetermined time is, for example, a time during which one individual makes one rotation in the cage when a fish to be imaged migrates in one direction around the center of the cage.

In step S302, the image acquisition unit 11 associates the first image and the second image, and records the result as the estimation target image pair in the storage unit 10. Specifically, the image acquisition unit 11 generates an ID for each of the acquired estimation target images (the first image and the second image), associates the first image with the ID of the first image and the second image with the ID of the second image, associates the first image with the second image, and newly records the result as the estimation target images in the storage unit 10. When the transmission of the image from the terminal 3 is stopped, the image acquisition unit 11 stops the reception processing. Accordingly, a pair of the first image and the second image to be estimated generated at predetermined time intervals are recorded. The captured image acquired by the image acquisition unit 11 may be an image configuring moving image data or may be still image data itself.

When acquiring respective pieces of moving image data corresponding to the left and right lenses from the stereo camera 2, the image acquisition unit 11 may sequentially acquire the captured images corresponding to the imaging times with a predetermined interval among the captured images configuring the respective moving image data as automatic recognition targets of the feature points of the fish. The time interval between the imaging times of the captured images configuring the moving image data may be, for example, a time during which a fish passes from one end to the other end on the left and right sides of the rectangular captured image. The feature point estimation unit 15 estimates each feature point on the surface of one or more fish appearing in each image by using the images captured at such time intervals.

In step S303, upon receiving the operation of the operator or the notification of the completion of acquisition of the size estimation target image, the feature point estimation unit 15 starts automatic recognition processing of the feature point of the fish. The feature point estimation unit 15 instructs the learning model acquisition unit 14 to acquire a learning model. The learning model acquisition unit 14 acquires the first learning model and the second learning model recorded in the storage unit 10 and outputs the first learning model and the second learning model to the feature point estimation unit 15.

In step S304, the feature point estimation unit 15 acquires one estimation target image pair (the first image and the second image) from the storage unit 10.

In step S305, the feature point estimation unit 15 starts automatic recognition processing using the neural network specified based on the first learning model, specifies the second rectangular ranges A2 surrounding the identical individual of fish appearing in both the first image and the second image, and further specifies the direction of the fish body. The processing of recognizing the identical individual of fish body appearing in the image pair (the first image and the second image) is performed by the identical individual specification unit 16. Based on the processing request from the feature point estimation unit 15, the identical individual specification unit 16 acquires the coordinates of the second rectangular range A2 specified in each of the first image and the second image from the feature point estimation unit 15. The identical individual specification unit 16 determines whether a range where any one of one second rectangular range A2 specified from the first image and one second rectangular range A2 specified from the second image overlaps with the other is equal to or more than a predetermined threshold value such as 70%. A known method such as a template matching method may be used for the determination. In this determination, in a case where a range where any one of the second rectangular ranges A2 specified in the first image and the second image overlaps with the other is equal to or more than the predetermined threshold value, the identical individual specification unit 16 determines that the fish bodies appearing in the second rectangular ranges A2 are the identical individual. In addition, in this determination of the identical individual specification unit 16, there is a case where a plurality of second rectangular ranges A2 recognized in one of the first image and the second image overlap with one or a plurality of second rectangular ranges A2 recognized in the other image by the predetermined threshold value such as 70% or more. In such a case, a combination of the second rectangular ranges A2 having the largest overlapping range may be specified from each of the first image and the second image, and it may be determined that the fish bodies appearing in the second rectangular ranges A2 are the identical individual.

In step S306, in a case where the direction of the fish body is opposite to the direction of the correct data, conversion is performed such that each pixel of the second rectangular range A2 is horizontally reversed to make the direction of the fish body the same as the direction of the correct data. In a case where the direction of the fish body is the same as the direction of the correct data, the conversion is not performed.

Figure 9:
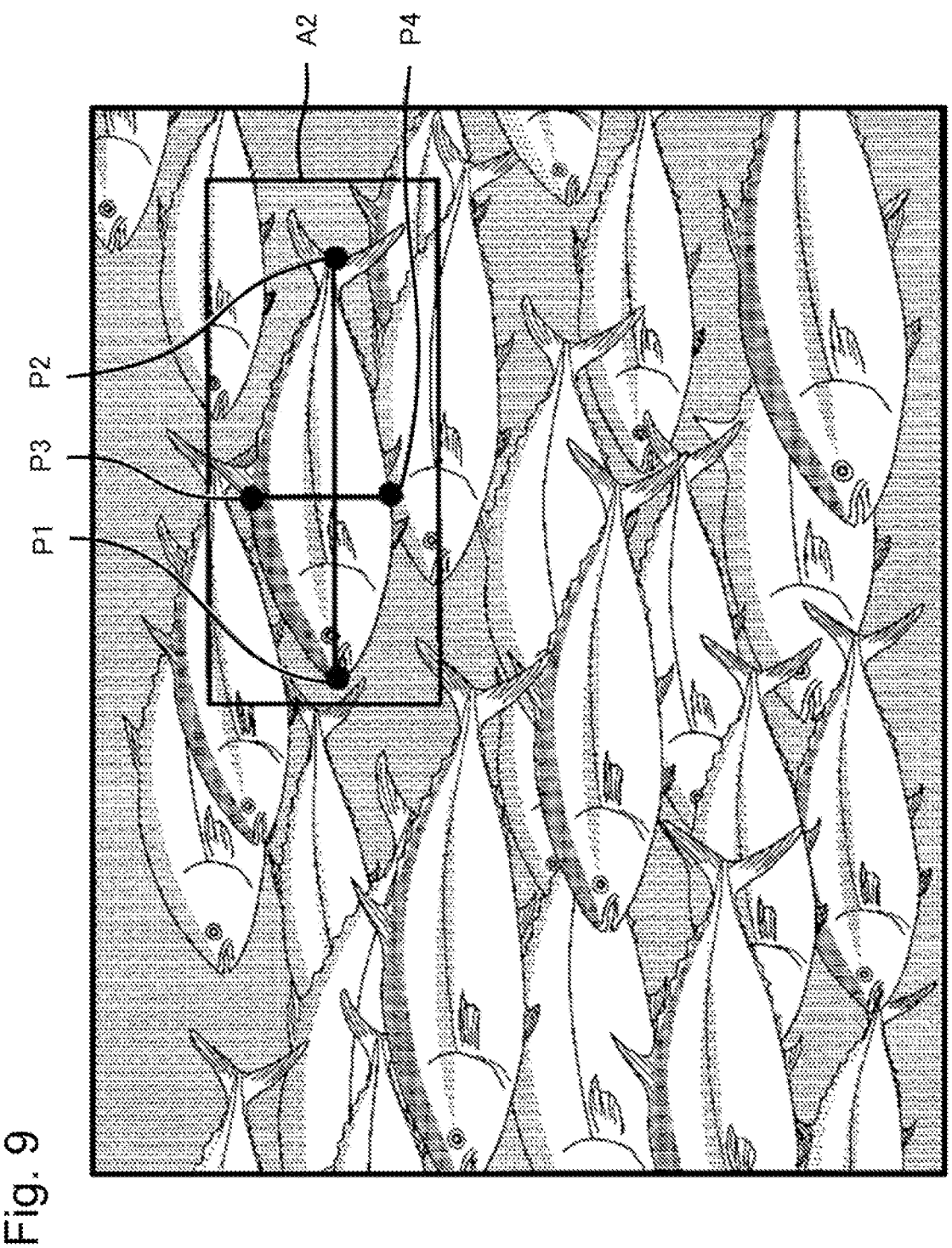
FIG. 9 is a view illustrating feature points of a surface of a fish in the first rectangular range in the first input image.

In step S307, the feature point estimation unit 15 specifies the circular ranges of the feature points P1, P2, P3, and P4 for each of the first image and the second image captured at the same time. The feature point estimation unit 15 starts automatic recognition processing of feature points using each pixel in the second rectangular range A2 and the neural network specified based on the second learning model, and specifies the circular ranges of the feature points P1, P2, P3, and P4 in the second rectangular range A2. FIG. 9 is a diagram illustrating an example of a result of the automatic recognition processing. As illustrated in FIG. 9, the feature point estimation unit 15 specifies the second rectangular range A2 including any fish body of a plurality of fish bodies appearing in the captured image. By the estimation processing, the feature point estimation unit 15 specifies feature points even in a captured image in which a head and a tail fin are cut at upper, lower, left, and right ends of the image. The feature point estimation unit 15 may specify circular ranges of the specified feature points.

The data discard unit 17 may detect estimation result including the feature points estimated outside the end of the captured image based on the coordinates of the feature points, and discard the data of the estimation result in a case where each relationship of the plurality of feature points is abnormal, for example, in a case where the relationship exceeds a predetermined threshold value or is smaller than the threshold value.

Incidentally, in a case where the second rectangular range A2 is small, the feature point may be specified using a third rectangular range obtained by enlarging the second rectangular range A2.

In step S308, the feature point estimation unit 15 generates the fish body ID of the fish included in the second rectangular range A2 in the first image and the second image, and records, in the storage unit 10, the fish body ID and the representative coordinates (such as center points) of the circular ranges of the feature points P1, P2, P3, and P4 specified in each captured image as the automatic recognition result of the feature points of the fish.

In step S309, the feature point estimation unit 15 determines whether the second rectangular range A2 including another fish body can be specified in the same image. As a result of the determination, in a case where there is the second rectangular range A2 of another fish, the processing returns to step S305, and in a case where there is no second rectangular range A2 of another fish, the processing proceeds to step S310.

In step S310, the feature point estimation unit 15 determines whether the next unprocessed image (for example, an image ID) to be subjected to the automatic recognition processing is stored in the storage unit 10. As a result of the determination, in a case where there is an unprocessed image to be subjected to the automatic recognition processing in the storage unit 10, the processing returns to step S304, and in a case where there is no unprocessed image to be subjected to the automatic recognition processing in the storage unit 10, the automatic recognition processing is ended, and the processing proceeds to step S311.

Figure 10:
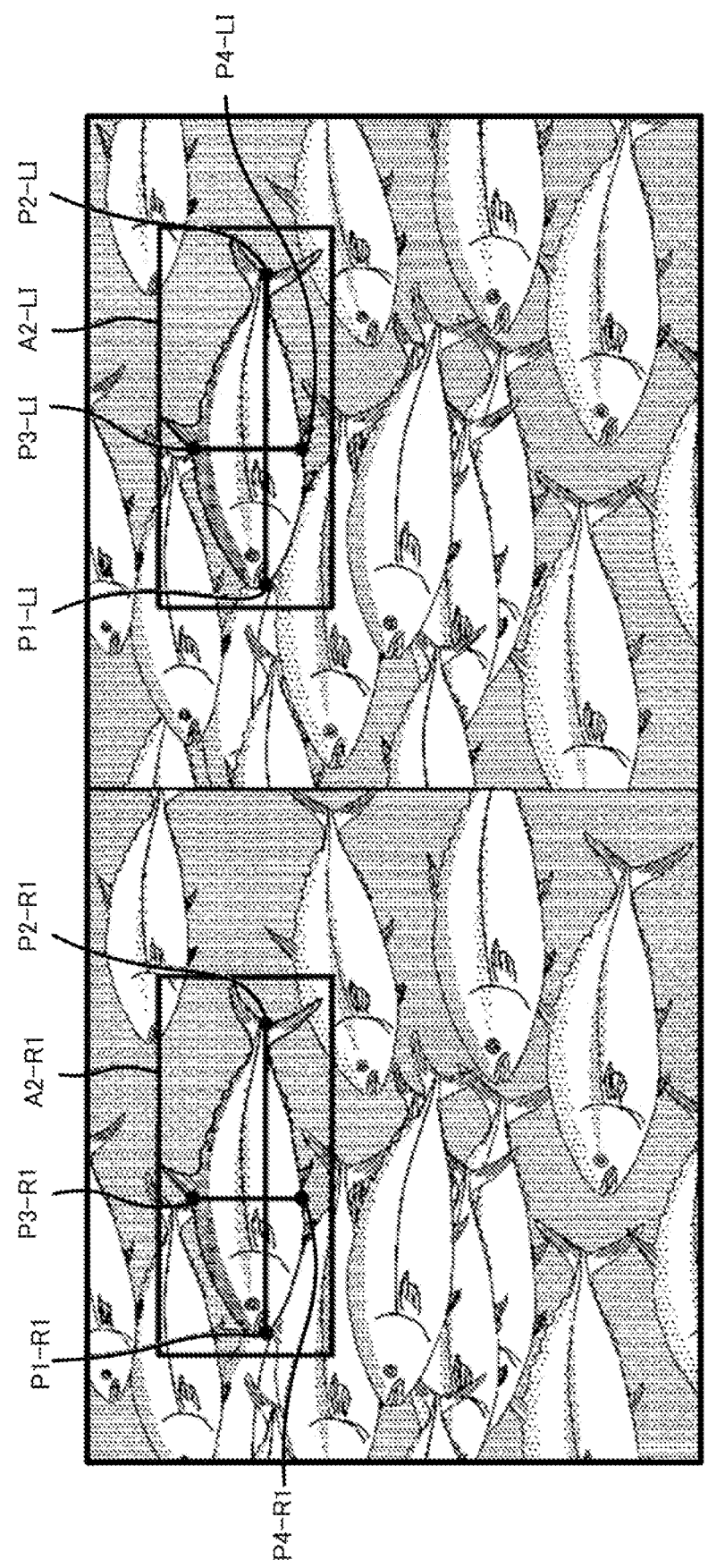
FIG. 10 is a view illustrating the feature points of the surface of the fish in the first rectangular ranges of a pair of images.

Here, FIG. 10 illustrates a result of the first automatic recognition processing. As illustrated in FIG. 10, the feature point estimation unit 15 specifies a second rectangular range A2-R1 in the first image (the image corresponding to the right lens). In addition, the feature point estimation unit 15 specifies feature points P1-R1, P2-R1, P3-R1, and P4-R1 in the image of the second rectangular range A2-R1. In addition, as illustrated in FIG. 10, the feature point estimation unit 15 specifies a second rectangular range A2-L1 in the second image (the image corresponding to the left lens). In addition, the feature point estimation unit 15 specifies feature points P1-L1, P2-L1, P3-L1, and P4-L1 in the image of the second rectangular range A2-L1.

Figure 11:
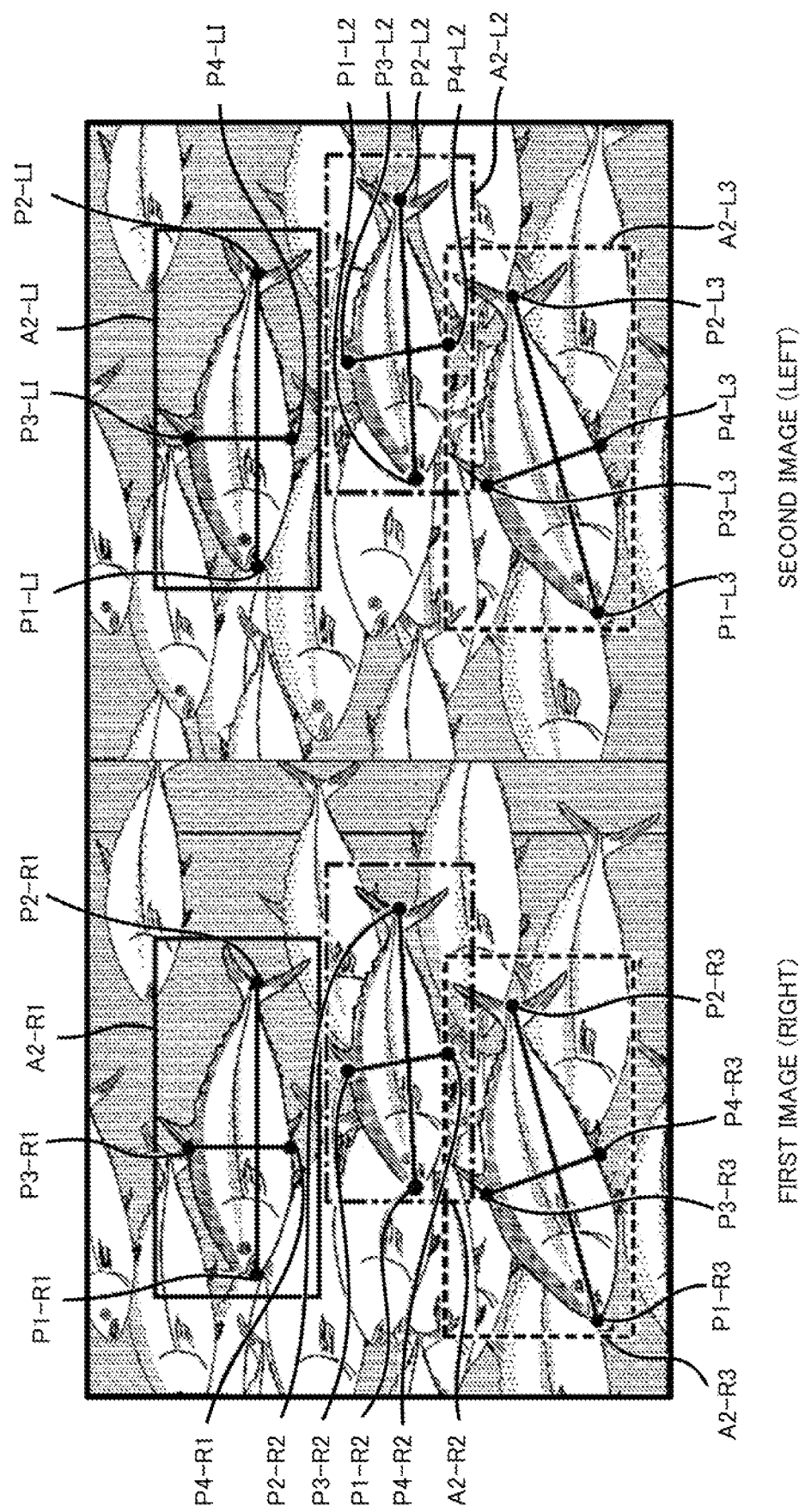
FIG. 11 is a view illustrating feature points of surfaces of a plurality of fish in the first rectangular ranges of a pair of images.

Here, FIG. 11 illustrates results of the second and third automatic recognition processing. The feature point estimation unit 15 also specifies a feature point of another fish appearing in the estimation target image. Specifically, the feature point estimation unit 15 specifies a second rectangular range A2-R2 in the first image and a second rectangular range A2-L2 in the second image in the second automatic recognition processing. Further, the feature point estimation unit 15 further specifies feature points P1-R2, P2-R2, P3-R2, and P4-R2 in the second rectangular range A2-R2, and feature points P1-L2, P2-L2, P3-L2, and P4-L2 in the second rectangular range A2-L2. Further, the feature point estimation unit 15 specifies the second rectangular range A2-R3 in the first image and the second rectangular range A2-L3 in the second image in the third automatic recognition processing. Further, the feature point estimation unit 15 further specifies the feature points P1-R3, P2-R3, P3-R3, and P4-R3 in the second rectangular range A2-R3, and the feature points P1-L3, P2-L3, P3-L3, and P4-L3 in the second rectangular range A2-L3. When the automatic recognition processing is ended in all estimation target images, the feature point estimation unit 15 proceeds to the size estimation processing in the following steps S311 to S317.

In step S311, the size calculation unit 18 reads, for each fish body ID, representative coordinates (for example, center points) of the feature points P1, P2, P3, and P4 obtained from the corresponding first image and representative coordinates of the feature points P1, P2, P3, and P4 obtained from the second image.

In step S312, the size calculation unit 18 calculates three-dimensional coordinates of each feature point in a three-dimensional space. For the calculation, a known technique for conversion into three-dimensional coordinates such as a direct linear transformation (DLT) method is used. In the DLT method, a calibration coefficient representing a relationship between coordinates of a point in a captured image and actual two-dimensional and three-dimensional coordinates is calculated in advance, and three-dimensional spatial coordinates are obtained from the point in the captured image by using this coefficient.

In step S313, based on the three-dimensional coordinates of each feature point, the size calculation unit 18 calculates a tail fork length connecting the three-dimensional coordinates of the feature point P1 and the three-dimensional coordinates of the feature point P2, and a body height connecting the three-dimensional coordinates of the feature point P3 and the three-dimensional coordinates of the feature point P4.

In step S314, the size calculation unit 18 inputs the tail fork length and the body height as variables to a weight calculation formula for calculating the weight of a fish, and calculates the weight.

Incidentally, based on an estimated value which is the calculation result of the tail fork length, the body height, and the weight calculated by the processing of the size calculation unit 18, in a case where the estimated value does not satisfy the predetermined condition, the data discard unit 17 may discard the estimated value. For example, in a case where the estimated value is not included in the range indicated by "the average value of estimated values+standard deviation×2", the data discard unit 17 may determine that the estimated value is not accurate. In a case where the positional relationship among the feature points P1, P2, P3, and P4 of the automatic recognition processing result to be determined is significantly deviated from the average positional relationship or the reference positional relationship registered in advance, the data discard unit 17 may discard the information of the feature points P1, P2, P3, and P4 of the automatic recognition processing result. In a case where the feature point P4 of the ventral fin is positioned on the upper portion of the captured image with respect to the tail fork length line connecting P1 and P2, the data discard unit 17 may discard the information of the feature points P1, P2, P3, and P4 of the automatic recognition processing result. In a case where a ratio of the tail fork length and the body height deviates from the average value or the reference value by, for example, 20% or more, the data discard unit 17 may discard the information of the feature points P1, P2, P3, and P4 of the automatic recognition processing result.

In step S315, the size calculation unit 18 determines whether information indicating sizes is calculated for all fish body IDs among the automatic recognition results of the feature points of the fish. As a result of the determination, when the information indicating sizes is calculated for all the fish body IDs, the processing proceeds to step S316, and when the information indicating sizes is not calculated for all the fish body IDs, the processing returns to step S311.

In step S316, the output unit 19 calculates the statistical information of the fish living in the cage based on the tail fork lengths, the body heights, and the weights relevant to all the fish body IDs.

In step S317, the output unit 19 outputs the calculated statistical information. The output unit 19 generates statistical information calculated for the tail fork lengths, the body heights, and the weights relevant to all the fish body IDs or output data generated based on the statistical information, and outputs the result to a display device (not illustrated) viewed by the operator.

As described above, the size estimation processing using the learned model ends.

(Modification)

When the second learning model is generated, only one direction (for example, the left direction) of the fish body may be learned. In this case, in the learning processing, the first rectangular range A1 of the fish facing the right direction may be horizontally reversed to be leftward and set as correct data, or may be discarded. Further, in the estimation processing, the first rectangular range A1 of the fish facing the right direction may be horizontally reversed to be leftward and then subject to be left-estimation processing, or may be discarded.

In the generation of the second learning model, two of a second learning model for right-facing using left-facing correct data and a second learning model for left-facing using right-facing correct data may be generated. At this time, in the estimation processing, the feature point is estimated by using the second learning model for left-facing when it is determined to be leftward by the first learning model and by using the second learning model for right-facing when it is determined to be rightward. At this time, the left-right reversal processing is unnecessary.

In the first learning model, only the coordinates of the four corners of the rectangular range A1 may be estimated, and the direction of the fish body may be estimated using another learning model.

Effects of First Example Embodiment

According to the present example embodiment, the size of the fish body can be estimated with high accuracy. This is because the learning unit 13 causes a learning model to learn using only the images (correct data) of the fish bodies aligned in the same direction, the feature point estimation unit 15 estimates feature points of the fish body using the learning model, and the size calculation unit 18 calculates the size of the fish body based on the feature points.

Second Example Embodiment

Figure 12:
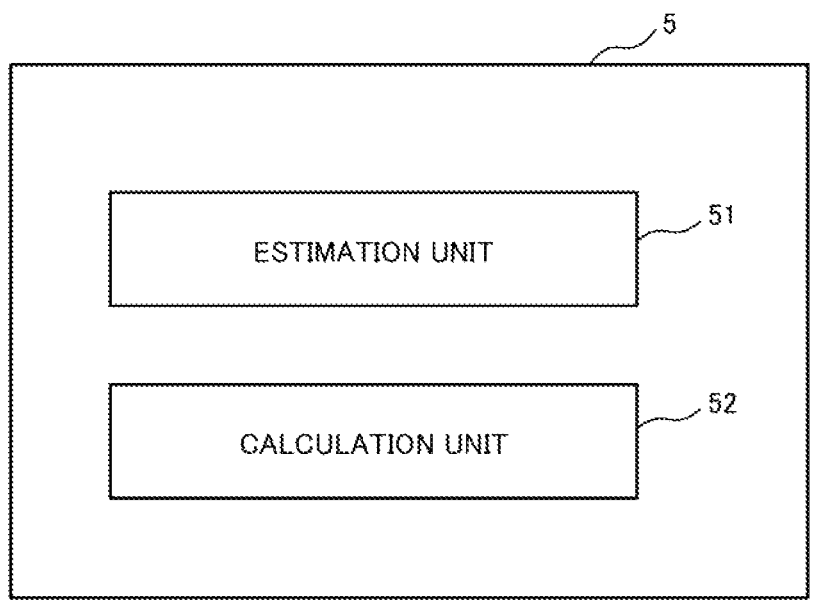
FIG. 12 is a block diagram illustrating a configuration example of a size estimation device according to a second example embodiment of the present disclosure.

As illustrated in FIG. 12, a size estimation device 5 according to a second example embodiment of the present disclosure includes an estimation unit 51 (corresponding to the feature point estimation unit 15 in FIG. 3) and a calculation unit 52 (corresponding to the size calculation unit 18 in FIG. 3). The size estimation device 5 is a minimum configuration example of the size estimation device 1 in the first example embodiment.

Based on a learning model which learns the feature of a first underwater creature body facing one direction in an image captured in the water, the estimation unit 51 estimates a first feature point that indicates one end on the one direction side of a second underwater creature body facing the one direction included in an image captured outside and a second feature point indicating the other end. An example of the first underwater creature body to be learned is a fish body, and an example of the second underwater creature body to be estimated is also a fish body. The one end on the one direction side may be a peripheral edge of the other end. The other end may be a peripheral edge of the other end. The estimation unit 51 may use two learning models (a first learning model and a second learning model) as learning models. For example, the estimation unit 51 uses the first learning model to specify the second rectangular range A2 (see FIG. 9) surrounding the identical individual of the second underwater creature body appearing in both the first image and the second image and the direction of the second underwater creature body, and uses the second learning model to estimate a feature point that specifies the shape feature of the second underwater creature body appearing in the second rectangular range A2. The feature point includes at least the first feature point and the second feature point. The first feature point is, for example, a point indicating a peripheral edge of one end on the head side (facing direction side) in the longitudinal direction of the second underwater creature body in the image. The second feature point is, for example, a point indicating a peripheral edge of the other end opposite to the direction in which the second underwater creature body faces.

The calculation unit 52 calculates information indicating the size of the second underwater creature body based on the feature points (information including the first feature point and the second feature point). The feature point may include a feature point indicating the surface of the fish body other than the first feature point and the second feature point. The information indicating the size is, for example, a tail fork length, a body length, a body height, and a weight. For example, the calculation unit 52 calculates three-dimensional coordinates of each feature point in a three-dimensional space. For the calculation, a known technique for conversion into three-dimensional coordinates such as a direct linear transformation (DLT) method is used. Based on the three-dimensional coordinates of the feature point, the calculation unit 52 calculates a tail fork length connecting the three-dimensional coordinates of the first feature point and the three-dimensional coordinates of the second feature point. At this time, the body height may be calculated using other feature points. The calculation unit 52 inputs information such as the tail fork length as variables to a weight calculation formula for calculating the weight of a fish, and calculates the weight.

According to the second example embodiment of the present disclosure, the size of an underwater creature can be estimated with high accuracy. This is because the estimation unit 51 estimates, based on the learning model which learns the feature of a fish body that facing one direction in an image captured in the water, the first feature point that indicates one end on the one direction side of a fish body facing the one direction included in an image captured outside and the second feature point that indicates the other end, and the calculation unit 52 calculates the information indicating the size of the fish body based on the information including the first feature point and the second feature point.

(Information Processing Device)

Figure 13:
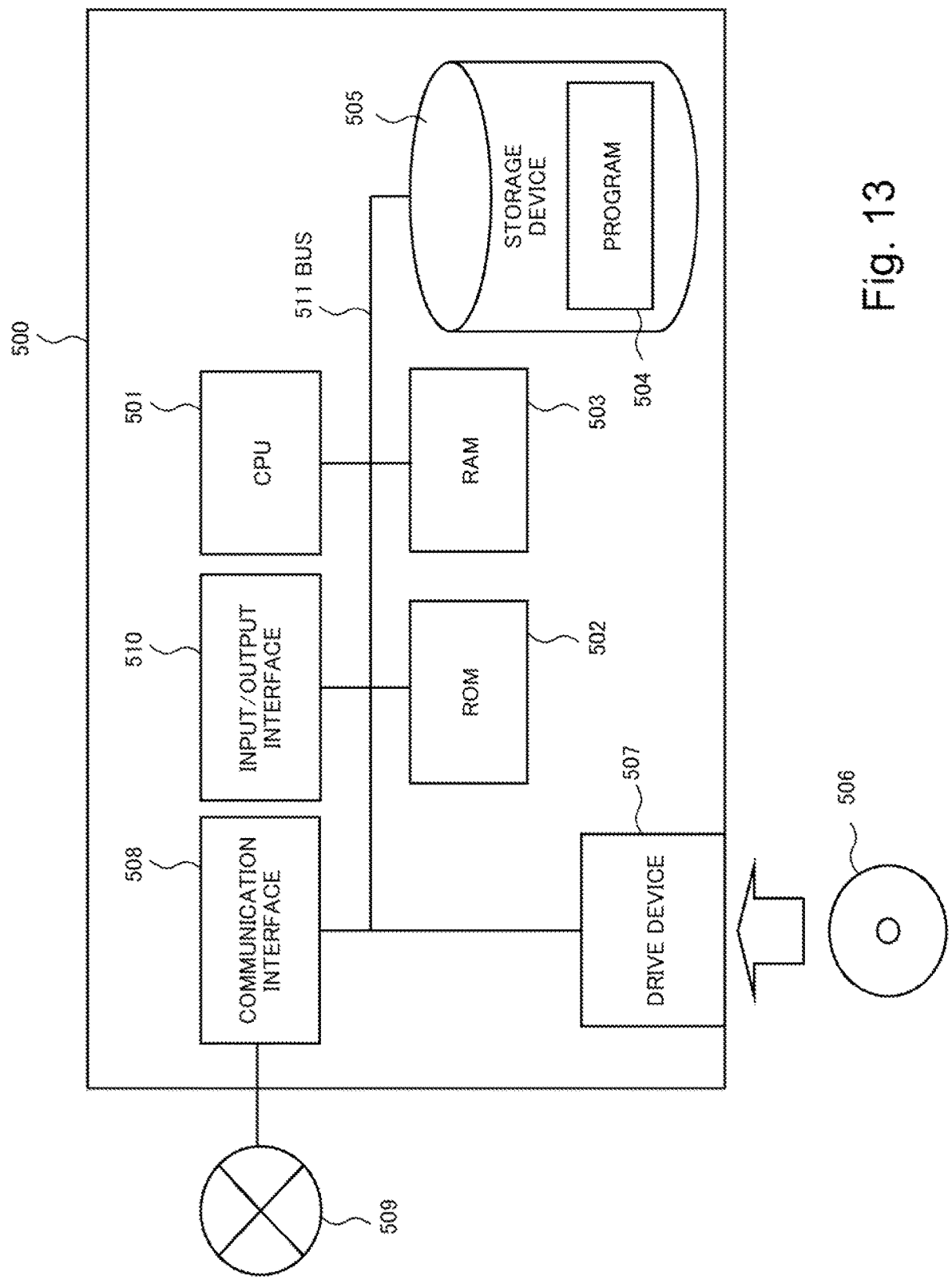
FIG. 13 is a block diagram illustrating a configuration example of an information processing device applicable in each example embodiment.

In each of the example embodiments of the present invention described above, some or all of the components in the size estimation device illustrated in FIGS. 3, 12, and the like can be achieved by using a random combination of an information processing device 500 and a program illustrated in FIG. 13, for example. The information processing device 500 includes the following configuration as an example.

CPU 501
ROM 502
RAM 503
Storage device 505 storing program 504 and other data
Drive device 507 that reads and writes recording medium 506
Communication interface 508 connected with communication network 509
Input/output interface 510 for inputting/outputting data
Bus 511 connecting each component Each component of the size estimation device according to each example embodiment of the present application is achieved by the CPU 501 acquiring and executing the program 504 for achieving these functions. The program 504 for achieving the function of each component of the size estimation device is stored in the storage device 505 or the RAM 503 in advance, for example, and is read by the CPU 501 as necessary. The program 504 may be supplied to the CPU 501 via the communication network 509, or may be stored in advance in the recording medium 506, and the drive device 507 may read the program and supply the program to the CPU 501.

There are various modifications of the achieving method of each device. For example, the size estimation device may be achieved by a random combination of a separate information processing device and program for each component. A plurality of components included in the size estimation device may be achieved by a random combination of one information processing device 500 and a program.

Some or all of the components of the size estimation device are achieved by other general-purpose or dedicated circuits, processors, or the like, or a combination thereof. These may be configured by a single chip or may be configured by a plurality of chips connected via a bus.

Some or all of the components of the size estimation device may be achieved by a combination of the above-described circuit or the like and program.

In a case where some or all of the components of the size estimation device are achieved by a plurality of information processing devices, circuits, and the like, the plurality of information processing devices, circuits, and the like may be arranged in a centralized manner or in a distributed manner. For example, the information processing device, the circuit, and the like may be achieved as a form, such as a client and server system or a cloud computing system, in which each is connected via a communication network.

While the present invention has been particularly shown and described with reference to present example embodiments thereof, the present invention is not limited to these example embodiments. It will be understood by those of ordinary skill in the art that various changes in form and details may be made therein without departing from the spirit and scope of the present invention as defined by the claims.

This application is based upon and claims the benefit of priority from Japanese patent application No. 2019-178601, filed on Sep. 30, 2019, the disclosure of which is incorporated herein in its entirety by reference.

REFERENCE SIGNS LIST 1 size estimation device
2 stereo camera
3 terminal
4 cage
5 size estimation device
10 storage unit
11 image acquisition unit
12 feature designation reception unit
13 learning unit
14 learning model acquisition unit
15 feature point estimation unit
16 identical individual specification unit
17 data discard unit
18 calculation unit
19 output unit
51 estimation unit
52 calculation unit
100 size estimation system
104 database
105 communication module
500 information processing device
504 program
505 storage device
506 recording medium
507 drive device
508 communication interface
509 communication network
510 input/output interface
511 bus

What is claimed is:

1. A size estimation device comprising:
a memory; and
at least one processor coupled to the memory,
the at least one processor performing operations to:
estimate, based on a learning model that learns a feature of a first underwater creature body facing one direction in an image captured in water, a first feature point that indicates one end on the one direction side of a second underwater creature body facing the one direction included in an image captured outside and a second feature point that indicates another end; and
calculate information indicating a size of the second underwater creature body based on information including the first feature point and the second feature point.

2. The size estimation device according to claim 1, wherein the at least one processor is further configured to
when the second underwater creature body included in the image captured outside does not face the one direction, convert a direction of the second underwater creature body into the one direction.

3. The size estimation device according to claim 1, wherein the at least one processor is further configured to
generate the learning model for learning feature points including a first feature point indicating one end on the one direction side in a longitudinal direction of the first underwater creature body and a second feature point indicating another end to use an image including a plurality of the first underwater creature bodies facing the one direction.

4. The size estimation device according to claim 3, wherein the at least one processor is further configured to
learn, as the learning model, a first learning model for estimating a range surrounding the first underwater creature body and a direction of the first underwater creature body, and a second learning model for estimating at least the first feature point and the second feature point of the first underwater creature body.

5. The size estimation device according to claim 3, wherein the at least one processor is further configured to
when there is a variation in the directions of the plurality of first underwater creature bodies, correct the directions of the first underwater creature bodies to face a predetermined direction among the one direction.

6. The size estimation device according to claim 1, wherein
the directions of the first underwater creature body and the second underwater creature body are calculated based on coordinate values of the first feature point and coordinate values of the second feature point.

7. The size estimation device according to claim 1, wherein the at least one processor is further configured to
estimate the first feature point and the second feature point in a longitudinal direction of the second underwater creature body, and a third feature point indicating one end in a short direction with respect to the longitudinal direction of the second underwater creature body and a fourth feature point indicating another end, the device further comprising:
calculate information indicating a size of the second underwater creature body by using the first feature point, the second feature point, the third feature point, and the fourth feature point.

8. A size estimation system comprising:
the size estimation device according to claim 1; and
one or more cameras that capture an image including the first underwater creature body and an image including the second underwater creature body in water and transmit the images to the size estimation device.

9. A size estimation method comprising:
estimating, based on a learning model that learns a feature of a first underwater creature body facing one direction in an image captured in water, a first feature point that indicates one end on the one direction side of a second underwater creature body facing the one direction included in an image captured outside and a second feature point that indicates another end; and calculating information indicating a size of the second underwater creature body based on information including the first feature point and the second feature point.

10. A non-transitory recording medium storing a size estimation program for causing a computer to achieve:

estimating, based on a learning model that learns a feature of a first underwater creature body facing one direction in an image captured in water, a first feature point that indicates one end on the one direction side of a second underwater creature body facing the one direction included in an image captured outside and a second feature point that indicates another end; and calculating information indicating a size of the second underwater creature body based on information including the first feature point and the second feature point.

* * * * *